United States Patent
Wright

(10) Patent No.: US 9,383,933 B2
(45) Date of Patent: *Jul. 5, 2016

(54) WRITING DATA IN A DISTRIBUTED DATA STORAGE SYSTEM

(71) Applicant: NETTAPP, INC., Sunnyvale, CA (US)

(72) Inventor: David D. Wright, Dacula, GA (US)

(73) Assignee: NETTAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,197

(22) Filed: Aug. 7, 2014

(65) Prior Publication Data

US 2014/0351363 A1  Nov. 27, 2014

Related U.S. Application Data

(63) Continuation of application No. 13/041,122, filed on Mar. 4, 2011, now Pat. No. 8,819,208.

(60) Provisional application No. 61/310,863, filed on Mar. 5, 2010.

(51) Int. Cl.
| | |
|---|---|
| *G06F 15/167* | (2006.01) |
| *G06F 3/06* | (2006.01) |
| *H04L 29/08* | (2006.01) |
| *G06F 15/173* | (2006.01) |

(52) U.S. Cl.
CPC ............ *G06F 3/0619* (2013.01); *G06F 3/0665* (2013.01); *G06F 3/0689* (2013.01); *G06F 15/173* (2013.01); *G06F 15/17331* (2013.01); *H04L 67/1097* (2013.01); *G06F 2003/0692* (2013.01)

(58) Field of Classification Search
CPC ........................... H04L 67/1097; H04L 67/10
USPC .......................................................... 709/223
See application file for complete search history.

(56) References Cited

U.S. PATENT DOCUMENTS

| | | | |
|---|---|---|---|
| 6,604,155 | B1 | 8/2003 | Chong, Jr. |
| 6,928,526 | B1 | 8/2005 | Zhu et al. |
| 7,065,619 | B1 | 6/2006 | Zhu et al. |
| 7,174,379 | B2 | 2/2007 | Agarwal et al. |

(Continued)

OTHER PUBLICATIONS

Alvarez, Carlos, "NetApp Deduplication for FAS and V-Series Deployment and Implementation Guide," Technical REport, TR-3505 Version 8, Feb. 2011.

(Continued)

*Primary Examiner* — Hua Fan
(74) *Attorney, Agent, or Firm* — Foley & Lardner LLP

(57) ABSTRACT

Methods, systems, and apparatuses, including computer programs encoded on computer-readable media, for receiving a write request that includes data and a client address at which to store the data. The data is segmented into the one or more storage units. A storage unit identifier for each of the one or more storage units is computed that uniquely identifies content of a storage unit. A mapping between each storage unit identifier to a block server is determined. For each of the one or more storage units, the storage unit and the corresponding storage unit identifier is sent to a block server. The block server stores the storage unit and information on where the storage unit is stored on the block server for the storage unit identifier. Multiple client addresses associated with a storage unit with the same storage unit identifier are mapped to a single storage unit.

15 Claims, 7 Drawing Sheets

(56) References Cited

U.S. PATENT DOCUMENTS

| | | |
|---|---|---|
| 2004/0107281 A1 | 6/2004 | Bose et al. |
| 2004/0133622 A1 | 7/2004 | Clubb et al. |
| 2006/0136718 A1* | 6/2006 | Moreillon ................... 713/155 |
| 2006/0156059 A1* | 7/2006 | Kitamura ............ G06F 11/1092 714/6.21 |
| 2009/0271412 A1 | 10/2009 | Lacapra et al. |
| 2010/0082648 A1* | 4/2010 | Potapov et al. ............... 707/756 |
| 2010/0250497 A1 | 9/2010 | Redlich et al. |
| 2010/0281080 A1 | 11/2010 | Rajaram et al. |
| 2011/0161725 A1* | 6/2011 | Allen et al. ................... 714/5.11 |
| 2011/0219106 A1 | 9/2011 | Wright |
| 2011/0238857 A1 | 9/2011 | Certain et al. |
| 2012/0124282 A1 | 5/2012 | Frank et al. |
| 2012/0317353 A1 | 12/2012 | Webman et al. |
| 2012/0317395 A1 | 12/2012 | Segev et al. |
| 2013/0042065 A1 | 2/2013 | Kasten et al. |
| 2013/0124776 A1 | 5/2013 | Hallak et al. |
| 2013/0173955 A1 | 7/2013 | Hallak et al. |
| 2013/0305002 A1 | 11/2013 | Hallak et al. |

OTHER PUBLICATIONS

Final Office Action issued for U.S. Appl. No. 13/041,122 mailed May 13, 2013 (22 pages).

Non-Final Office Action issued in U.S. Appl. No. 13/041,122 dated Dec. 5, 2012 (24 pages).

Non-Final Office Action issued in U.S. Appl. No. 13/041,095 mailed Jun. 17, 2013 (14 pages).

Notice of Allowance issued in U.S. Appl. No. 13/041,095 mailed Oct. 9, 2013 (9 pages).

Notice of Allowance received in U.S. Appl. No. 13/041,122 mailed Apr. 24, 2014, 19 pages.

Proceedings of the FAST 2002 Conference on File Storage Technologies, Monterey, California, USA, Jan. 28-30, 2002.

Non-Final Office Action received for U.S. Appl. No. 14/684,956 mailed Jul. 14, 2015, 8 pages.

T6 Final Office Action received for U.S. Appl. No. 14/684,956 mailed Dec. 2, 2015, 14 pages.

* cited by examiner

_US 9,383,933 B2_

WRITING DATA IN A DISTRIBUTED DATA STORAGE SYSTEM

CROSS REFERENCE TO RELATED APPLICATIONS

The present application is a continuation of U.S. application Ser. No. 13/041,122, filed Mar. 4, 2011, and claims priority to U.S. Provisional Application No. 61/310,863, filed Mar. 5, 2010, the contents of which are incorporated herein by reference in their entirety.

BACKGROUND

Particular embodiments generally relate to a distributed data storage system.

A unit of data, such as a file or object, includes one or more storage units (e.g., bytes), and can be stored and retrieved from a storage medium. For example, disk drives in storage systems are divided into logical blocks that are addressed using logical block addresses (LBAs). The disk drives use spinning disks where a read/write head is used to read/write data to/from the drive. It is desirable to store an entire file in a contiguous range of addresses on the spinning disk. For example, the file may be divided into blocks or extents of a fixed size. Each block of the file may be stored in a contiguous section of the spinning disk. The file is then accessed using an offset and length of the file. The contiguous range of addresses is used because disks are good at sequential access, but suffer performance degradation when random access to different non-contiguous locations is needed.

Storage systems typically do not have a mechanism to minimize the amount of storage used when duplicate copies of data are stored. Duplicate data may occur at different locations within a single file or between different independent files all in the same file system. However, because clients store data based on addresses in the storage medium, duplicate data is typically stored. For example, a first client stores a first file in a first range of addresses and a second client stores a second file in a second range of addresses. Even if duplicate data is found in the first file and the second file, storage systems prefer to store the first file and the second file in separate contiguous locations so that the data for either file can be accessed sequentially.

Some storage systems, such as a write-anywhere file layout (WAFL), a logical volume manager (LVM), or new technology file system (NTFS), allow multiple objects to refer to the same blocks through a tree structure to allow for efficient storage of previous versions. For example, a snapshot feature may eliminate some duplicate data caused by multiple versions of the same file, but this is only to the extent that different versions are created and controlled by the file system itself.

Some data storage systems can identify and eliminate duplicate copies of data within or between files. However, these systems typically deal with monolithic systems. For example, the elimination may occur on a single computer system.

SUMMARY

In one embodiment, a method is provided for accessing data that includes one or more storage units. An access request for data is received. The access request includes a client address for the data. A metadata server determines a mapping between the client address and one or more storage unit identifiers for the data. Each of the one or more storage unit identifiers uniquely identifies content of a storage unit and the metadata server stores mappings on storage unit identifiers that are referenced by client addresses. The one or more storage unit identifiers are sent to one or more block servers. The one or more block servers service the request using the one or more storage unit identifiers where the one or more block servers store information on where a storage unit is stored on a block server for a storage unit identifier. Also, multiple client addresses associated with a storage unit with a same storage unit identifier are mapped to a single storage unit stored in a storage medium for a block server.

In one embodiment, the access request is a write request. The method further includes determining a block server in the one or more block servers based on a storage unit identifier in the one or more storage unit identifiers, wherein different block servers are associated with different ranges of storage unit identifiers and sending the storage unit identifier and the storage unit to the block server associated with the storage unit identifier.

In one embodiment, the access request is a read request. The method further includes: determining a storage unit identifier in the one or more storage unit identifiers for a storage unit in the one or more storage units; determining a block server in the one or more block servers that is storing the storage unit based on the storage unit identifier, wherein different block servers are associated with different ranges of storage unit identifiers; and sending the read request with the storage unit identifier to the determined block server.

In one embodiment, the data includes a plurality of storage units associated with the client address and the plurality of storage units are stored in a non-contiguous address space on a plurality of block servers.

In one embodiment, the storage medium includes a solid state storage device.

In one embodiment, a non-transitory computer-readable storage medium contains instructions for accessing data that includes one or more storage units. The instructions are for controlling a computer system to be operable to: receive an access request for data, the access request including a client address for the data; determine, by a metadata server, a mapping between the client address and one or more storage unit identifiers for the data, each of the one or more storage unit identifiers uniquely identifying content of a storage unit, wherein the metadata server stores mappings on storage unit identifiers that are referenced by client addresses; and send the one or more storage unit identifiers to one or more block servers, the one or more block servers servicing the request using the one or more storage unit identifiers, wherein the one or more block servers store information on where a storage unit is stored on a block server for a storage unit identifier, wherein multiple client addresses associated with a storage unit with a same storage unit identifier are mapped to a single storage unit stored in a storage medium for a block server.

In one embodiment, a system includes a metadata server configured to: store mappings on storage unit identifiers that are referenced by client addresses; receive an access request for data, the access request including a client address for the data; and compute one or more storage unit identifiers for the data, each of the one or more storage unit identifiers uniquely identifying content of a storage unit. The system also includes a plurality of block servers wherein block servers are associated with different ranges of storage unit identifiers and store information on where a storage unit is stored on a block server for a storage unit identifier, wherein each block server is configured to: receive a storage unit in the one or more storage units if a storage unit identifier corresponds to the range of storage unit identifiers associated with the block server; and service the request using the received storage unit identifier. Also, multiple client addresses associated with a storage unit with a same storage unit identifier are mapped to a single storage unit stored in a storage medium in a block server.

The following detailed description and accompanying drawings provide a better understanding of the nature and advantages of the present invention.

DETAILED DESCRIPTION

Described herein are techniques for a distributed data storage system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Overview

Figure 1:
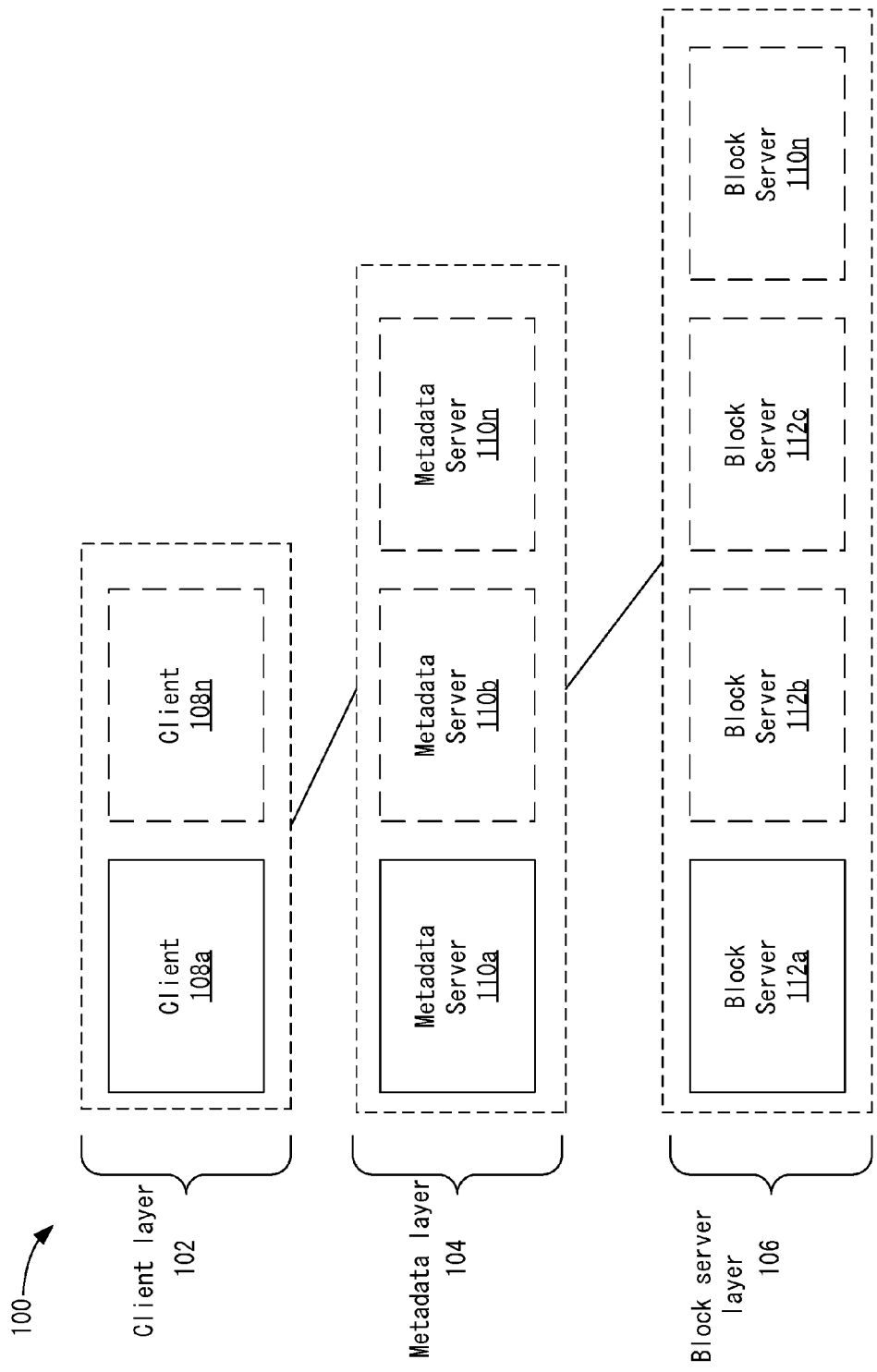
FIG. 1 depicts a system for a distributed data storage system according to one embodiment.

FIG. 1 depicts a system 100 for a distributed data storage system according to one embodiment. System 100 includes a client layer 102, a metadata layer 104, and a block server layer 106.

Client layer 102 includes one or more clients 108a-108n. Metadata layer 104 includes one or more metadata servers 110a-110n. Block server layer 106 includes one or more block servers 112a-112n. Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one embodiment, one or more metadata servers 110 may be combined with one or more block servers 112 in a single machine. Entities in system 100 may be virtualized entities. For example, multiple virtual block servers 112 may be included on a machine. Entities may also be included in a cluster, where computing resources of the cluster are virtualized such that the computing resources appear as a single entity.

Clients 108 include client processes that may exist on one or more physical machines. When the term "client 108" is used in the disclosure, the action being performed may be performed by a client process. A client process is responsible for storing, retrieving, and deleting data in system 100. A client process may address pieces of data depending on the nature of the storage system and the format of the data stored. For example, the client process may reference data using a client address. The client address may take different forms. For example, in a storage system that uses file storage, client 108 may reference a particular volume or partition, and a file name. With object storage, the client address may be a unique object name. For block storage, the client address may be a volume or partition, and a block address. Clients 108 communicate with metadata layer 104 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

Block servers 112 store data for clients 108. In one embodiment, data may be broken up into one or more storage units. Data may be segmented into data blocks. Data blocks may be of a fixed size, may be initially a fixed size but compressed, or may be of a variable size. Data blocks may also be segmented based on the contextual content of the block in a larger data string. Maintaining segmentation of the blocks on a write (and corresponding re-assembly on a read) may occur in client layer 102 and/or metadata layer 104. Also, compression may occur in client layer 102, metadata layer 104, and/or block server layer 106.

In one example, data may be stored in a volume that is referenced by client 108. A volume may be made up of one or more volume slices. The data associated with the volume includes a list of volume slices for that volume. A volume slice is a list of blocks for a portion of a volume. A block is the raw data for a volume and may be the smallest addressable unit of data. In one embodiment, a data block may be referred to as a storage unit. However, a storage unit may also refer to other subsets of data. For discussion purposes, the term data block will be used instead of a storage unit.

Block servers 112 store data on a storage medium. The storage medium may include different medium formats. For example, electromechanical disk storage or solid state storage drive may be used. Electromechanical disk storage may include spinning disks that use movable read/write heads to read/write to/from different locations of the spinning disks. Inserting the read/write head at various random locations results in slower data access than if data is read from a sequential location. A solid state storage drive uses a solid state memory to store persistent data. Solid state drives use microchips that store data in non-volatile memory chips and contain no moving parts. Also, solid state drives can perform random access and parallel reads/writes efficiently.

Data blocks may be stored in block server layer 106 based on unique block identifiers. A block identifier is an identifier that is determined based on the content of the data block. The block identifier is unique to that block of data. For example, blocks with the same content have the same block identifier, but blocks with different content have different block identifiers. Block servers 112 maintain a mapping between a block identifier and the location of the data block in a storage medium of block server 112. As will be discussed in more detail below, data blocks with the same block identifiers are not stored multiple times on a block server 112 when received in multiple client write requests.

Metadata layer 104 stores metadata that maps between client layer 102 and block server layer 106. For example, metadata servers 110 map between the client addressing used by clients 108 (e.g., file names, object names, block numbers, etc.) and block layer addressing (e.g., block identifiers) used in block server layer 106. Clients 108 may perform access based on client addresses. However, block servers 112 do not store data based on client addresses. Rather, as will be discussed in more detail below, block servers 112 store data based on unique block identifiers for the data.

Figure 2:
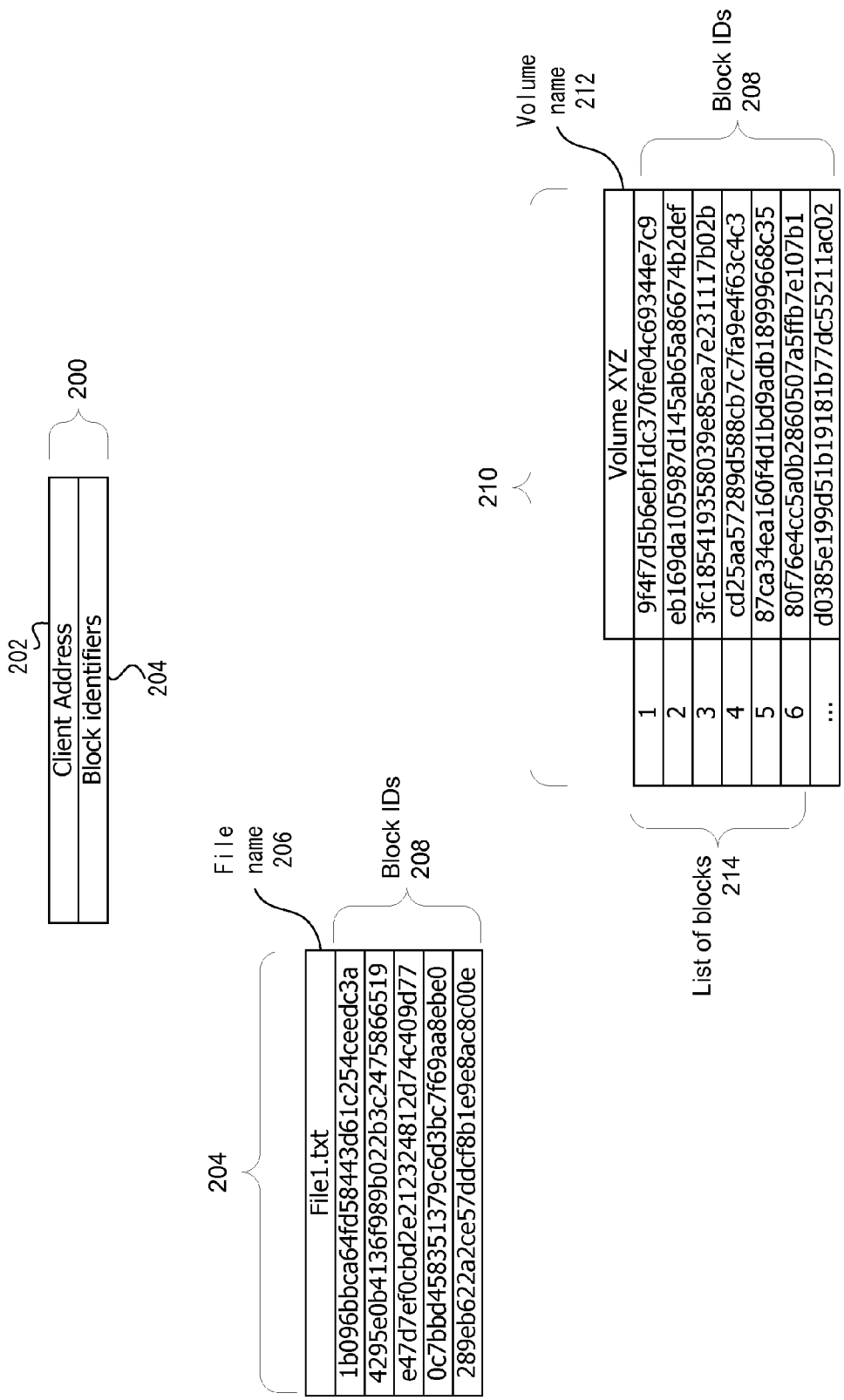
FIG. 2 depicts an example of metadata according to one embodiment.

FIG. 2 depicts an example of metadata according to one embodiment. At 200, the metadata includes a client address 202 and block identifiers 204. Client address 202 is the address referenced by client to perform access to data. For example, when clients want to read, write, or delete data, the client address for that data is used. The client address references the address in which client 102 thinks the data is stored in block server layer 106. The client address may use different formats. For example, client address 202 may reference a particular volume or partition, and a file name. With object storage, client address 202 may be a unique object name. For block storage, client address 202 may include a volume or partition, and a block address.

At 204, an example of metadata for file-oriented storage is shown. A file name 206 is the name of a file. A list of block identifiers 208 is then associated with file name 206. The block identifiers may be hexadecimal numbers, but other representations may be used. Additional metadata may also be included, such as inode numbers, directory pointers, modification dates, file size, etc. Block identifiers are identifiers that uniquely identify the data of the file. For example, each block identifier uniquely identifies a data block in the file.

At 210, metadata for a block-based system is shown. A volume name 212 is the name of the volume. A list of blocks 214 identifies blocks in the volume using block addresses. Also, a list of block identifiers 208 is associated with the lists of blocks 214. The client address in this case may be a volume name 212 and one or more block addresses in lists of blocks 214.

Figure 3:
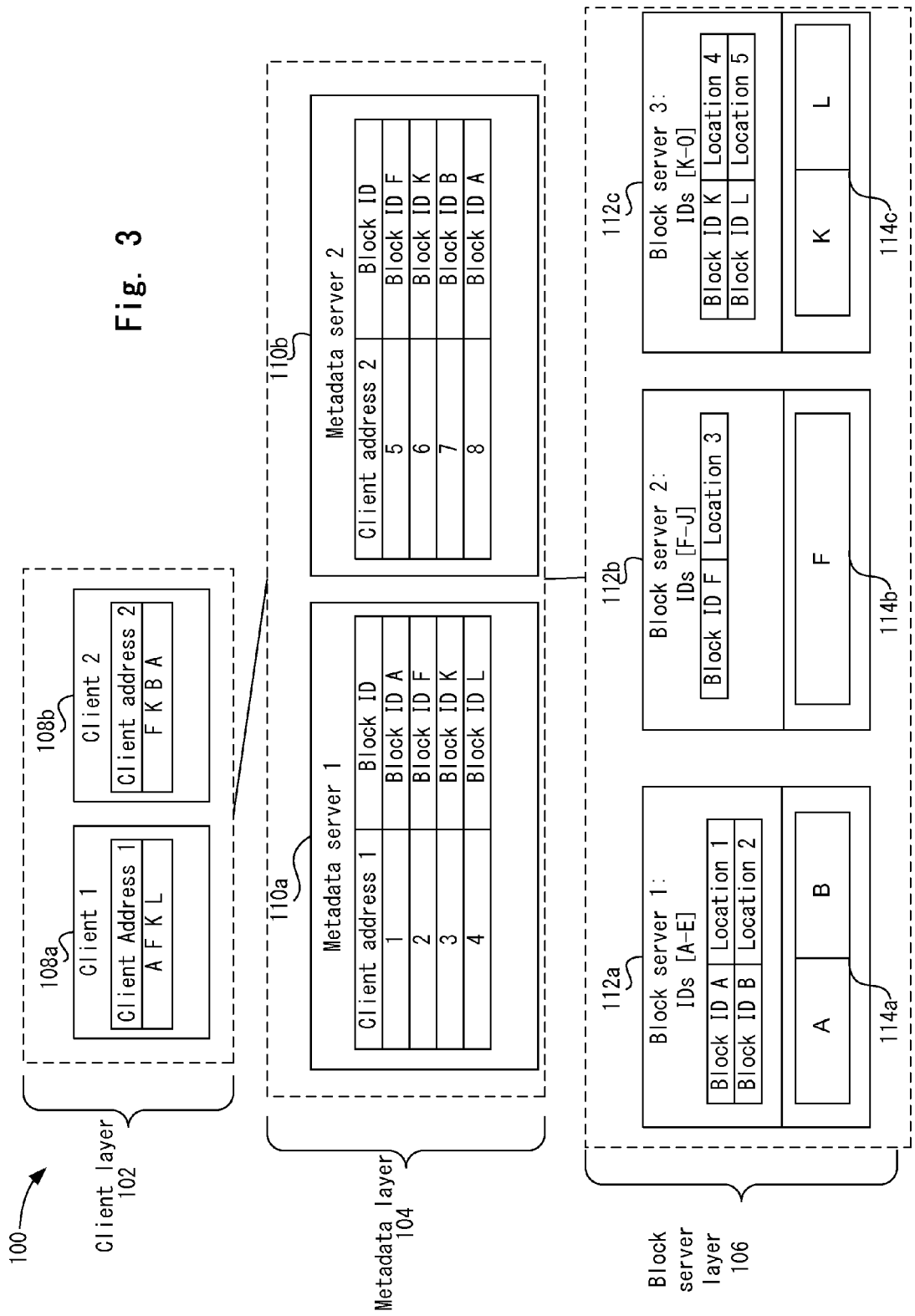
FIG. 3 depicts a more detailed example of the system according to one embodiment.

FIG. 3 depicts a more detailed example of system 100 according to one embodiment. FIG. 3 shows how data is stored in system 100. A client 108a (client 1) and a client 108b (client 2) may both wish to read and/or write data. For example, client 1 may wish to write data to a volume at a client address 1. For example, client address 1 may be a target name of the volume and a list of block identifiers (logical block addresses). The data that client 1 wishes to write includes data blocks A F, K, and L.

Client 2 may wish to write data at client address 2. For example, client address 2 may reference a different volume than client address 1 and a different list of block identifiers. Other formats of client addressing may also be used. For discussion purposes, client address 1 and client address 2 are used to reference the respective data blocks and data block identifiers. The data that client 2 wishes to write may include data blocks F, K, B, and A. Accordingly, data blocks A, F, and K are duplicates between the data that client 1 and client 2 wish to write.

Metadata layer 104 is shown as including metadata server 110a (metadata server 1) and metadata server 110b (metadata server 2). Different metadata servers may be associated with different client addresses. For example, different metadata servers 110 may manage different volumes of data. In this example, metadata server 1 is designated as handling client address 1 and metadata server 2 is designated as handling client address 2.

For each client address, a list of block identifiers is stored. The block identifiers represent data blocks associated with the client address. For example, for client address 1, the block identifiers of block ID A, block ID F, block ID K, and block ID L are stored and associated with client address 1. Each block identifier is associated with a block of data. Similarly, in metadata server 2, client address 2 is associated with block IDs F, K, B, and A.

Block server layer 106 includes block servers 112a, 112b, and 112c (block servers 1, 2, 3, respectively). In one embodiment, block servers 112 are assigned to different ranges of block identifiers. For example, block server 1 is assigned to store data for block identifiers A-E, block server 2 stores data for block identifiers F-J, and block server 3 stores data for block identifiers K-O. In this case, data for a client address may not be stored in sequential locations on a storage medium in a single block server 112. Rather, the data is stored based on the block identifier determined for data.

Block server 1 stores data for block identifier A and block identifier B. Block server 1 maintains a mapping between the block identifier and the location on the storage medium where the data associated with block identifier A is stored. For example, block identifier A is mapped to a location 1 where data for block identifier A is stored on block server 1 and block identifier B is mapped to a location 2 where data for block identifier B is stored on block server 1. Also, block server 2 stores data for block identifier F in location 3 on block server 2, and block server 3 stores data for block identifiers K and L in locations 4 and 5, respectively, in block server 3.

Particular embodiments allow for the real time de-duplication of data. For example, client address 1 is associated with data for blocks A, F, K, and L and client address 2 is associated with data for blocks F, K, B, and A. Blocks A, B, and K are duplicated across client address 1 and client address 2. Although not shown in this example, de-duplication may also occur within data for a single client address. Instead of storing two copies of blocks A, B, and K, block server 1 stores one copy each of data block A and data block B. Also, block server 3 stores one copy of data block K. Thus, duplicate blocks A, B, and K are not stored in block servers 112. This may efficiently use data storage on block servers 112. Using the above scheme, the blocks for a client address may not be stored in sequential locations on a storage medium 114. For example, for client address 1, block A is stored on block server 1 in storage medium 114a, block F is stored on block server 2 in storage medium 114b, and blocks K and L are stored on block server 3 in storage medium 114c.

In one embodiment, storage medium 114 in block server 112 may be a solid state device, such as non-volatile memory (e.g., flash memory). The solid state device may be electrically programmed and erased. The data blocks may be stored on the solid state device and persist when block server 112 is powered off. Solid state devices allow random access to data in an efficient manner and include no physical moving parts. For example, the random access is more efficient using solid state devices than if a spinning disk is used. Thus, data stored in data blocks for a client address in a non-contiguous address space and even different block servers 112 may still be accessed efficiently.

In one embodiment, storage medium 114 may include multiple solid state drives (e.g., flash memory drives). Each drive may store data for a portion of the block identifiers.

Although a solid state device is described, it will be understood that spinning disks may also be used with particular embodiments.

Particular embodiments may perform reading, writing, and deleting of data. The following will describe each process separately.

Write Requests

Figures 4A, 4B:
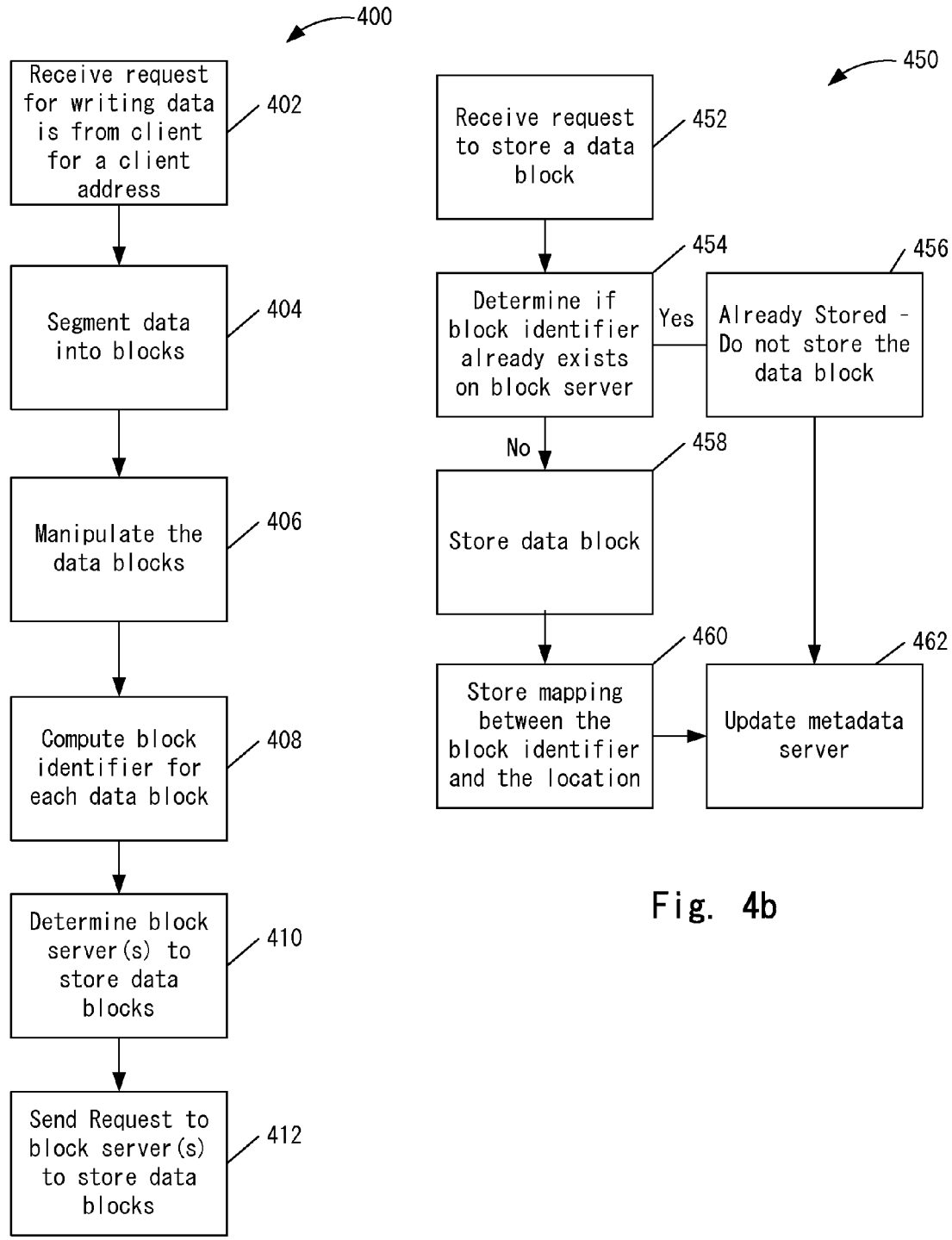
FIG. 4a depicts a simplified flowchart of a method for writing data at a metadata server according to one embodiment.
FIG. 4b depicts a simplified flowchart for processing a write request at a block server according to one embodiment.

FIG. 4a depicts a simplified flowchart 400 of a method for writing data at metadata server 110 according to one embodiment. At 402, a request for writing data is received from client 108 for a client address. At 404, metadata server 110 segments the data into blocks. At 406, metadata server 110 may manipulate the data blocks. For example, the data blocks may be compressed. However, compression may not be performed.

At 408, metadata server 110 computes a block identifier for each data block. In one embodiment, a unique block identifier is determined for each data block. For example, a cryptographic hash, such as a secure hash algorithm (SHA)-1, SHA-256, or message-digest algorithm 5 (MD-5), over the data block may be used. The hash value (or a variant of a computed hash value) is then used as the block identifier.

At 410, metadata server 110 determines one or more block servers in which to store the data blocks. To determine which block servers 112 to use, a mapping between the block identifier and a list of block servers 112 is determined. As discussed above, different block servers 112 service different ranges of block identifiers. Different methods may be used to map between block identifiers and block servers 112, such as a table that maps each range of block identifiers to one or more block servers 112, consistent hashing, or a straight hash of the identifier.

At 412, block servers 112 are sent a request to store the data block. For example, different block servers associated with the different block identifiers are sent different requests.

FIG. 4b depicts a simplified flowchart 450 for processing a write request at a block server 112 according to one embodiment. At 452, block server 112 receives the request to store a data block. The method will be described with respect to one block server 112; however, it will be understood that multiple block servers 112 may receive different write requests for different block identifiers.

At 454, block server 112 determines if the block identifier already exists on the block server. For example, if the data block identified by the block identifier is already stored on block server 112, block server 112 may already have stored a mapping between the block identifier and a location on a storage medium 114.

At 456, if the data block is already stored, then the data block is not stored again. Some other data may need to be updated if the data block has already been stored. For example, an "in use" flag may be set for use during data deletion, which will be described later.

If the data block does not exist, then at 458, the data block is stored in a location by block server 112. Block server 112 may also compress the data block if it has not been compressed already. At 460, a mapping between the block identifier and the location is stored.

At 462, block server 112 updates metadata server 110 to indicate the data block was already stored or the data block was just stored. Also, metadata server 110 may insert a mapping between the client address and the block ID upon receiving the indication.

Referring to FIG. 3, the write process will be described. In one example, client 108a may wish to write data to client address 1. Data blocks A, F, K, and L are received at metadata server 110a (or 110b). A hash value for each data block is determined. Metadata server 110a then determines which block servers 112 are assigned to service the write request based on the block identifiers. In this case, data block A is sent to block server 112a, data block F is sent to block server 112b, and data blocks K and L are sent to block server 112c. Once each block server 112 stores the respective block(s), confirmation is received at metadata server 110a and the block identifiers are stored with client address 1.

Client 108b may then wish to write data to client address 2. Data blocks F, K, B, and A are received at metadata server 110a (or 110b). A hash value for each data block is determined. Metadata server 110a then determines data blocks A and B are sent to block server 112a, data block F is sent to block server 112b, and data block K is sent to block server 112c. Block server 112a determines that data block A exists on storage medium 114a and thus does not need to be stored again. However, data block B is not located on storage medium 114a and is stored. Confirmation that data blocks A and B have been stored is sent to metadata server 110a. Block server 112b determines that data block F has already been stored and thus does not store data block F again. Confirmation that data block F has been stored is sent to metadata server 110a. Block server 112c determines that data block K has already been stored and thus does not store data block K again. Confirmation that data block K has been stored is sent to metadata server 110a. Once each block server 112 stores the respective block(s), metadata server 110a stores the block identifiers with client address 2.

Read Requests

Figures 5A, 5B:
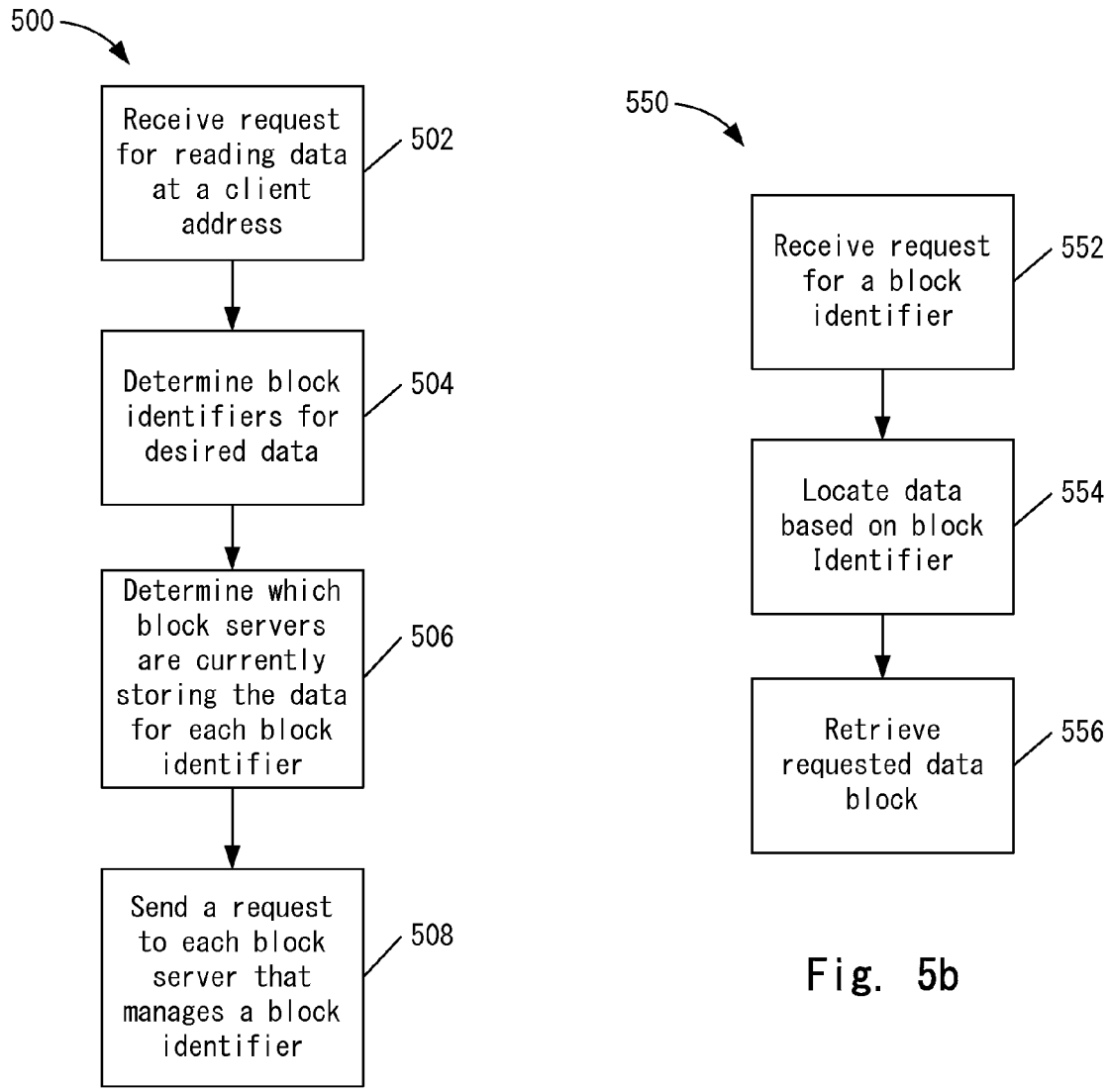
FIG. 5a depicts a simplified flowchart of a method for processing a read request at the metadata server according to one embodiment.
FIG. 5b depicts a simplified flowchart of a method for processing a read request at the block server according to one embodiment.

A read request will now be described. FIG. 5a depicts a simplified flowchart 500 of a method for processing a read request at metadata server 110 according to one embodiment. At 502, a request for reading data at a client address is received from client 108 at metadata server 110. The request may reference a client address, but not specific block servers 112. This is because metadata layer 104 is abstracting block server layer 106 from client layer 102. In this case, client 108 may assume that data has been stored with respect to the client address in a sequential manner in block server layer 106.

At 504, metadata server 110 determines block identifiers for the requested data. For example, metadata server 110 may look up a mapping of the client address to block identifiers.

At 506, metadata server 110 determines which block servers 112 are currently storing the data for each block identifier. As discussed above, data for different block identifiers may be stored on different block servers 112 that service different ranges of block identifiers. Metadata server 110 determines the different block servers 112 based on the ranges of block identifiers determined. At 508, metadata server 110 sends a request to each block server 112 that manages a block identifier.

FIG. 5b depicts a simplified flowchart 550 of a method for processing a read request at a block server 112 according to one embodiment. The method is described with respect to a single block server 112; however, the method may be applied to all block servers 112 that are sent requests.

At 552, block server 112 receives a request for a data block identifier. At 554, block server 112 locates the requested data block based on the block identifier. For example, block server 112 may access a mapping between the block identifier and the location of the stored block data. Different methods may be used to access the location, such as an on-disk hash table or tree, an in-memory hash table or tree, a sorted list of data blocks, or a database of block identifiers.

At 556, once the data block is located, block server 112 retrieves the requested data block. If the data block was compressed by block server 112, it may be decompressed before being returned to client 108. In one embodiment, block server 112 may return the data block to client 108 directly, or the data block may be returned to the metadata server 110 that requested the data block.

Referring to FIG. 3, in one example, client 108a may wish to read data from client address 1. A read request for client address 1 is received at metadata server 110a (or 110b). Because of the de-duplication of data, the data blocks A, F, K, and L may not have been stored on a contiguous address space for client address 1. Metadata server 110a determines the block identifiers for the data blocks. The associated block servers 112 for the block identifiers are then determined. A read request is then sent to the determined block servers 112. For example, block server 112a is sent a read request for data block A, block server 112b is sent a read request for data block F, and block server 112c is sent a read request for data blocks K and L. Block servers 112a-c retrieve the data blocks based on the block identifiers and send the data blocks to metadata server 110a. Metadata server 110a then sends the data blocks to client 108a.

Data Deletion

The deletion of data will now be described. Data may be deleted from system 100 when a client address in which the data is stored is overwritten with other data or when a client address becomes invalid (e.g., a file or object is deleted). However, because there is not a 1:1 mapping between client addresses and stored data blocks (e.g., because there are multiple client addresses that have the same data block referenced by the same block identifier), system 100 needs to make sure that data is only deleted when it is no longer needed. For example, a data block should not be deleted if it is being referenced by another client address.

Block servers 112 do not know which clients 112 are referencing the data blocks. This is because metadata server 110 is used to abstract the client addresses. Accordingly, block servers 112 cannot remove an overwritten or deleted block because block servers 112 do not know if other clients 108 are using this data block. Because metadata server 110 knows which data blocks are in use by client 108, block servers 112 and metadata servers 110 need to efficiently communicate to determine which data blocks are in use and which are not in use. "In use" means a data block is currently referenced by a client 108 and "not in use" means a data block is not referenced by any clients 108.

Different methods may be used to perform the deletion. One method for tracking which data blocks can be deleted is referred to as "garbage collection." Garbage collection is where an algorithm periodically runs to identify data that is no longer needed and then deletes the no long needed data.

One method of garbage collection may be a mark and sweep method that involves block servers 112 first marking all of their current block identifiers using a marker that indicates a block is "not in use". This may be an indication that the data block is not being used. Next, each metadata server 110 sends a list of the block identifiers that are currently valid (stored at valid client addresses) to block servers 112. Each list may only contain the block identifiers that correspond to each block server 112. Each block server 112 then marks each data block in the list as "in use". Once all the lists have been processed, block server 112 can remove any data blocks whose block identifiers are still marked as "not in use" because these data blocks are no longer being referenced by any client addresses. Any blocks that are written during the garbage collection process may automatically be marked as "in use" so they are not removed at the end of the process. This process removes the data blocks; however, it requires large lists of addresses to be communicated between metadata servers 110 and block servers 112. This may cause significant overhead if communication occurs over a LAN or WAN network.

Figures 6A, 6B:
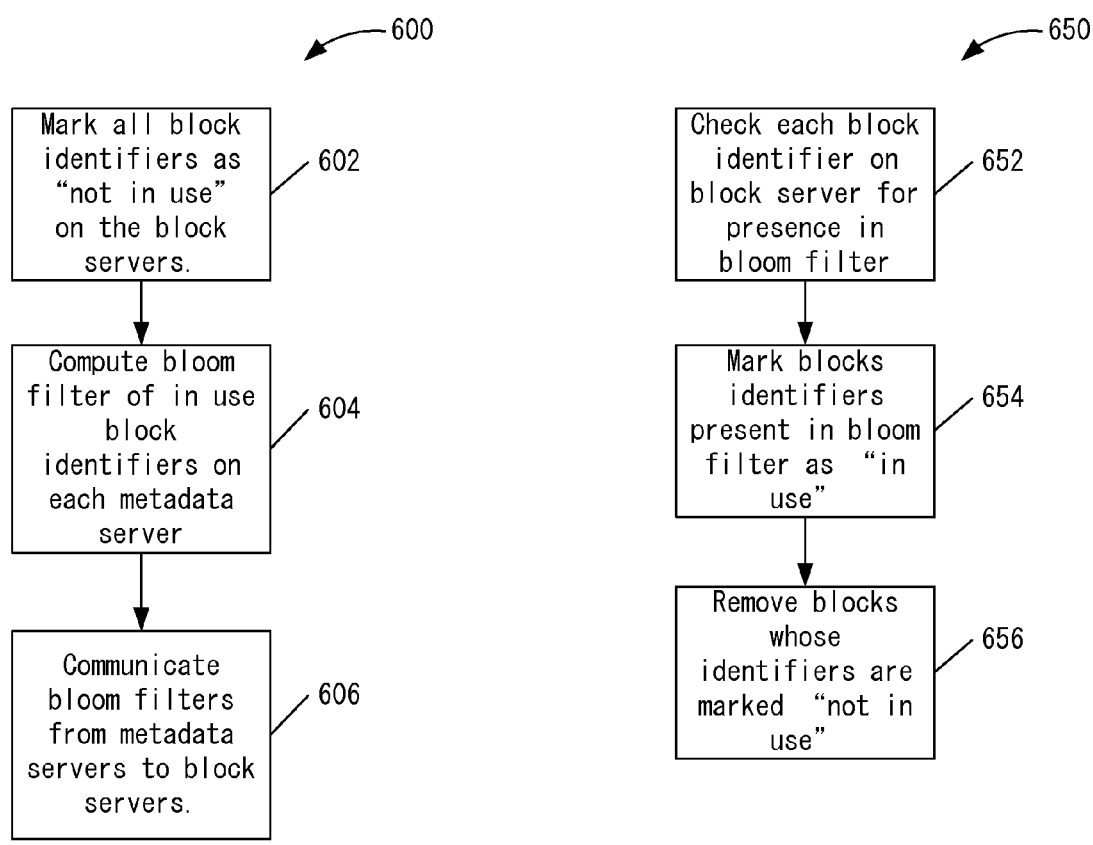
FIG. 6a depicts a simplified flowchart of a method for computing a Bloom filter at the metadata server according to one embodiment.
FIG. 6b depicts a simplified flowchart of a method for processing a Bloom filter at the block server according to one embodiment.

A second method of garbage collection may be referred to as a Bloom filter mark and sweep. FIGS. 6a and 6b depict methods for performing a Bloom filter mark and sweep method according to one embodiment. The methods use a filter, such as a Bloom filter, to reduce an amount of data that is communicated between metadata servers 110 and block servers 112. Although a Bloom filter is discussed, other filters may be used. A Bloom filter is a type of bit field that may be used for membership testing. A Bloom filter is a compact representation of a set of data that can be used to later test for the presence of individual elements. For example, the elements A, B, C, and D may be represented in a Bloom filter. Block server 112 can test whether any of the elements are in the Bloom filter. However, the Bloom filter may not be used to generate the list of elements A, B, C, and D.

In exchange for the reduction in size, a small possibility of an error may be introduced. For example, a small percentage chance exists that an element may appear to be present when it is in fact not. This chance of error may be controlled by selecting a size for the Bloom filter based on a number of possible elements that can be stored on block server 112. Additionally, an error may not be fatal because the result of the error is that an element will just not be deleted when it is actually "not in use". Accordingly, an error in which a data block is deleted when it is still being referenced by client 108 does not occur.

FIG. 6a depicts a simplified flowchart 600 of a method for computing a Bloom filter at metadata server 110 according to one embodiment. At 602, block servers 112 mark all data block identifiers as "not in use". At 604, each metadata server 110 computes a Bloom filter for in-use block identifiers. A single Bloom filter that includes all metadata on metadata server 110 for all block servers 112 might be computed. Also, multiple Bloom filters for subsets of metadata on metadata server 110 for each block server 112 may be computed. The more metadata that is encompassed by the Bloom filter, the larger the Bloom filter is, which requires more memory and more network bandwidth to transmit. When multiple Bloom filters are used, such as one Bloom filter for each block server 112 or multiple Bloom filters for each block server 112, Bloom filters may be constructed serially or in parallel. Constructing Bloom filters in parallel may require more memory, but reduces the number of times metadata is read to build the Bloom filters. Similarly, combining Bloom filters before processing on block server 112 allows for fewer passes through the list of data blocks on block server 112, but may require larger Bloom filters and more memory.

At 606, each metadata server 110 communicates a Bloom filter containing the valid block identifiers for a specific block server 112 to that block server 112. For example, each block server 112 may reference a range of block identifiers. Metadata server 110 may compute a Bloom filter for data block identifiers in each range. A Bloom filter is then sent to each respective block server 112. In another embodiment, a Bloom filter for the entire range of data block identifiers may also be computed and sent to each block server 112.

FIG. 6b depicts a simplified flowchart 650 of a method for processing a Bloom filter at block server 112 according to one embodiment. Although the method is described with respect to one block server 112, the method may be performed by multiple block servers 112. At 652, a block server 112 checks each block identifier present on the block server against the received Bloom filter.

At 654, if the Bloom filter indicates the block identifier is in use, block server 112 marks the block identifiers as "in use". Block server 112 may perform this check individually for each Bloom filter from each metadata server 110, or block server 112 can combine the Bloom filters (using a standard OR method) and perform the check against combined filters at one time.

At 656, block server 112 removes any data blocks whose block identifier is still marked "not in use" because they are no longer referenced by any client address. Any blocks written during the garbage collection process may automatically be marked as "in use" so they are not removed at the end of the process.

In one example, Bloom filters for each block server 112 may be constructed in parallel on metadata server 110. The amount of metadata contained in each filter may be limited. For example, a fixed Bloom filter size is selected (e.g., defined by available memory) and created for each block server 112. Metadata on metadata server 110 is processed and Bloom filters are updated with data block identifiers in the metadata. When each Bloom filter reaches the optimal threshold of bits set (e.g., 50%), the Bloom filter is sent to block server 112 and a new Bloom filter is started for that block server 112. Block servers 112 process each Bloom filter as the Bloom filter arrives rather than combining Bloom filters from multiple metadata servers 110.

The Bloom filter mark and sweep method reduces network communication bandwidth needed between metadata servers 110 and block servers 112. A small percentage chance that a block may be indicated as "in use" when it is no longer actually in use may occur, but a block will not be marked as "not in use" if the data block was actually still in use. Thus, the integrity of the data storage system is not at risk.

Bloom filters are useful because the filter may be used to represent block identifiers that are referenced by multiple client addresses once. Thus, even if a block identifier is associated with multiple client addresses, the block identifier can only be included once in the Bloom filter. This saves space, but also allows robust testing of whether a data block is in use. Also, the Bloom filter does not increase in size when multiple copies of the same block identifier are included, Another method of garbage collection may be tracking which data blocks can be deleted from the system using a reference count for each data block stored on block servers 112. Each time a given block identifier is written into a storage medium, a reference count for that data block is incremented (starting at 1 the first time a block identifier is written). When a data block is overwritten or deleted by client 108, a reference count is decremented until it reaches zero. At this point, no client addresses reference the block identifier and a corresponding block data may be deleted.

This method may operate in real time. For example, when a block is no longer needed, the data block can be immediately detected and deleted to free space for other data blocks. However, if any reference count is incorrectly incremented or decremented, a data block may either be deleted when it is still being referenced by a client 108 or not be deleted although it is no longer being referenced.

Redundancy

Data redundancy is provided to allow system 100 to continue operation in the event of a failure. One method is to have each storage medium 114 used by block servers 112 implement a local redundancy technology, such as redundant array of independent disks (RAID), to spread data over multiple storage media 114 to survive the failure of an individual storage medium. However, in some cases, this method may not survive the failure of an entire metadata server 112 or block server 112. The data redundancy is different from de-duplication in that block servers 112 may store a data block (or metadata) once on a storage medium 114 in response to a write from a client 108. The data block may be replicated using additional writes to other storage media 114 found in different block servers 112 or different storage media 114 in the same block server 112.

In one embodiment, for metadata servers 110, failures may be handled by replicating the metadata to one or more additional metadata servers 110. Thus, if one metadata server 110 fails, the additional copies of metadata may be used to continue accessing the data. Replication may be performed by client 102 or directly by metadata server 110 in a chained or fanned-out fashion. For example, client 102 may send multiple read/write requests to multiple metadata servers 110. Also, metadata servers 110 may replicate the write requests to other metadata servers 110.

For block servers 112a, replication may also be performed where each data block is replicated to one or more additional block servers 112. In this way, a block may always be read and/or written to even if a specific block server 112 is unavailable. The mapping from block identifiers to data blocks may take into account the amount of redundancy required and map a block identifier to multiple block servers 112 where the data block can be stored and retrieved. Replication may be performed by a client 108 writing to each block server 112 to enable the replication. Also, a replication may be performed from a block server 112 to another block server 112 in a chained or fanned-out fashion.

The above method of redundancy uses additional write commands to replicate data. Clients 108, metadata servers 110, and/or block servers 112 can thus perform the redundancy algorithm without modification of what commands are used. In other conventional methods, such as RAID, a RAID controller or specialized RAID software is needed. Also, in RAID, multiple copies of data are mirrored between storage devices inside the same system, or a parity system is used to spread the data between multiple storage devices in the same system. Particular embodiments store multiple copies on different block servers 112 on different physical machines, increasing the recoverability in case of entire system failure.

Another method that can be used to handle block server failure is the use of an erasure code, such as a Reed-Solomon code, to spread the data for a single block across multiple block servers in such a way that even if a single block server 112 is unavailable, the data from other block servers 112 can be used to reconstruct the original data block. For example, the code may be used to recover the data from a failed block server 112. This method may require less data storage space allowing for a configurable amount of redundancy.

Measuring Space Used

The actual space used by a subset of client data stored in system 100 may need to be measured. Conventionally, determining the space used by a particular client address (e.g., file, volume, or object) within a storage system is determined by measuring the amount of space dedicated to a client address. This is because of the 1:1 mapping between client address and space. However, in particular embodiments, client data is split into data blocks and only unique data blocks are stored, which may make it difficult to determine how much actual storage space is consumed by a single piece of client data or a group of client data. For example, if two objects have the exact same content, the space required is the size of one object rather than both.

Different methods may be used to determine the actual space used by a subset of client data. A first method to determine the space being used creates a list of unique blocks used by the client data that is being measured. In one embodiment, metadata servers 110 are aware of the block identifiers for each piece of client data. Once the list of data blocks has been determined, a total size of the data is calculated based on the size of each block in the list, or by a multiplication if fixed-size blocks are being used.

A second method uses a filter, such as a Bloom filter. In this case, the Bloom filter is used as a size counter. The Bloom filter is first emptied. The list of block identifiers contained in the client data that is being measured is then processed sequentially. For each block identifier, it is determined if the block identifier is present in a Bloom filter. If the block identifier is, the process continues to the next block identifier. If the block identifier is not, the block identifier is added to the Bloom filter and a size counter is incremented by the size of the block corresponding to the block identifier (or a fixed value if fixed-size blocks are being used). In the second method, a large list of block identifiers is not kept. Instead, a smaller Bloom filter and size counter are used.

A third method uses a Bloom filter, but not a size counter. A Bloom filter may start out empty and a list of block identifiers contained in the client data being measured is sequentially processed. For each block identifier, the Bloom filter is checked to see if the block identifier is present. If the block identifier is, the process proceeds to the next block identifier. If the block identifier is not, the block identifier is added to the Bloom filter. At the end of the process, the number of block identifiers included in the Bloom filter may be estimated, such as using the following formula: $n=\log(z/m)/((k*\log((1-1/m))))$, where z corresponds to the number of zero bits in the Bloom filter, n corresponds to the total number of bits in the Bloom filter, and k corresponds to the number of hash functions used when constructing the Bloom filter. To determine the approximate size of the client data, n is multiplied by the block size (for fixed-size blocks) or by an average or estimate of the block size (for variable size blocks). This method may be executed in parallel or on multiple metadata servers 110. Each metadata server 110 may compute its own Bloom filter using the subset of client data it maintained. Finally, the Bloom filters from all metadata servers 110 may be combined (using an OR operation), and the formula used above estimates a total amount of unique data.

Detailed Example of System

Figure 7:
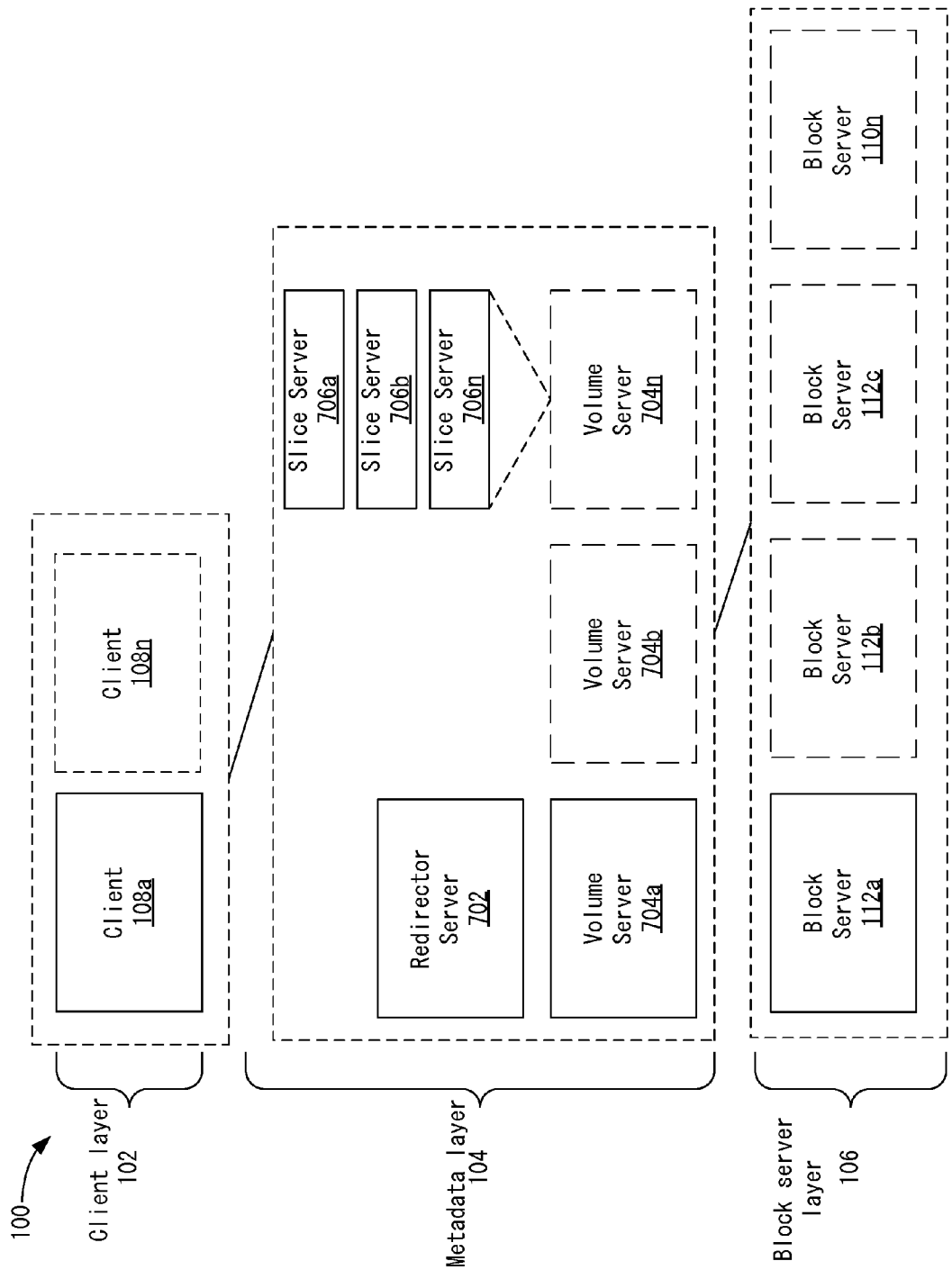
FIG. 7 depicts a more detailed example of the system according to one embodiment.

FIG. 7 depicts a more detailed example of system 100 according to one embodiment. In this example, metadata layer 104 may include a redirector server 702 and multiple volume servers 704. Each volume server 704 may be associated with a plurality of slice servers 706.

In this example, client 108a wants to connect to a volume (e.g., client address). Client 108a communicates with redirector server 702, identifies itself by initiator name, and also indicates a volume by target name that client 108a wants to connect to. Different volume servers 704 may be responsible for different volumes. In this case, redirector server 702 is used to redirect the request to a specific volume server 704. To client 108, redirector server 702 may represent a single point of contact. The request from client 108a then is redirected to a specific volume server 704. For example, redirector server 702 may use a database of volumes to determine which volume server 704 is a primary volume server for the requested target name. The request from client 108a is then directed to the specific volume server 704 causing client 108a to connect directly to the specific volume server 704. Communications between client 108a and the specific volume server 704 may then proceed without redirector server 702.

Volume server 704 performs functions as described with respect to metadata server 110. For each volume stored on volume server 704, a list of block identifiers is stored with one block identifier for each logical block on the volume. Each volume may be replicated between one or more volume servers 704 and the metadata for each volume may be synchronized between each of the volume servers 704 hosting that volume. If volume server 704 fails, redirector server 702 may direct client 108 to an alternate volume server 704.

In one embodiment, the metadata being stored on volume server 704 may be too large for one volume server 704. Thus, multiple slice servers 706 may be associated with each volume server 704. The metadata may be divided into slices and a slice of metadata may be stored on each slice server 706. When a request for a volume is received at volume server 704, volume server 704 determines which slice server 706 contains metadata for that volume. Volume server 704 then routes the request to the appropriate slice server 706. Accordingly, slice server 706 adds an additional layer of abstraction to volume server 704.

When client 108 writes blocks of data (e.g., via the iSCSI protocol), volume server 704 may compress the data blocks and buffer the written data to local storage. Replication of the data to other volume servers 704 may also be performed. After a period of time that may vary based on the space available for buffering on volume server 704, the data blocks are sent to one or more block servers 112 based on their block identifier, and metadata in volume server 704 is updated with the block identifiers. The delay introduced by this buffering reduces the amount of data written to block servers 112. If a specific client address is overwritten during the delay period, only the newer data blocks are sent to block servers 112.

When client 108 reads data blocks, volume server 704 determines if the client address is in a local volume server buffer. If so, the data may be returned from the local buffer. This may be faster than accessing block servers 112. If the data blocks are not stored in the local volume server buffer, the block identifiers for the requested data blocks are determined using the metadata. Requests are sent to block servers 112 that correspond to block identifiers to read the data blocks. As data is returned from block servers 112 to volume servers 704, the data is sent back to client 108 to satisfy the request.

CONCLUSION

Particular embodiments provide many advantages. For example, data is stored in a space-efficient manner including de-duplication of data both within a file or object and between files and objects that may be logically related to each other. The data de-duplication occurs in real time or near real time without adding significant latency or overhead. Data may be spread among a number of block servers 112, each of which may include multiple storage devices, allowing system 100 to handle storage of extremely large amounts of data. The data may be stored in any format, such as files, objects, fixed-size blocks, and variable size blocks.

When data is deleted from system 100, it may be removed in an efficient manner. For example, the garbage collection method may be used. Data may also be compressed and de-compressed to save space in a manner that is transparent to client 108. Also, data may be stored in a redundant fashion such that the loss of any entity in metadata layer 104 or block server layer 106 will not impact the ability to store or retrieve data from system 100. Further, the actual space used by a subset of the data, taking into account the effects of de-duplication, may be efficiently calculated.

Particular embodiments may use solid state storage devices. For example, solid state storage devices allow random access or random addressing of data that is as fast or nearly as fast as sequential access on a spinning disk. Also, solid state devices allow parallel reads/writes, which are not possible in spinning disks. The attributes of solid state devices thus lend themselves to particular embodiments because data for a client address may be stored in random non-sequential locations and/or different block servers 106. Because solid state devices may be randomly accessed very fast, particular embodiments may provide the de-duplication of data to use less storage space but provide access efficiency as compared to spinning disks that store data sequentially and also may store duplicate data.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method for writing data, the data including one or more storage units, the method comprising:
   receiving a write request, the write request including client data and a client address, wherein the client address identifies the client data;
   segmenting the client data into the one or more storage units;
   computing a storage unit identifier for each of the one or more storage units, wherein the storage unit identifier for each of the one or more storage units uniquely identifies content of a storage unit associated with the storage unit identifier;
   determining, by a metadata server, a mapping between each storage unit identifier to a block server; and
   for each of the one or more storage units, sending the storage unit and the corresponding storage unit identifier to a block server based upon the mapping between the storage unit identifier to the block server, wherein the block server stores the storage unit and maps the storage unit identifier to where the storage unit is stored on the block server, wherein a storage unit that is associated with multiple client addresses is mapped to a single storage unit and stored on a block server one time, wherein the storage unit is not stored multiple times on a single storage medium on the block server, determining a plurality of storage unit identifiers associated with client data;
   for each of the plurality of storage unit identifiers:
      determining if the storage unit identifier is present in a Bloom filter; and
      adding the storage unit identifier to the Bloom filter based upon the determining the storage unit identifier is not present in the Bloom filter; and
   calculating an amount of space used by the client data based upon the Bloom filter.

2. The method of claim 1, wherein the block server determines if the storage unit identifier already exists on the block server, wherein the block server does not store the storage unit on the block server if the storage unit identifier already exists on the block server, and wherein the block server stores the storage unit if the storage unit identifier does not exist on the block server.

3. The method of claim 1, further comprising:
   determining a number of unique storage unit identifiers associated with client data; and
   calculating an amount of space used by the client data based upon the number of unique storage units identifiers.

4. The method of claim 1, wherein computing a storage unit identifier for each of the one or more storage units comprises computing a hash of content for a respective storage unit.

5. The method of claim 1, further comprising:
   for each of the one or more storage units, sending the storage unit and the corresponding storage unit identifier to a second block server to redundantly store the storage unit and the corresponding storage unit identifier on multiple block servers.

6. The method of claim 1, further comprising redundantly storing the mapping between the client address and one or more storage unit identifiers in multiple metadata servers, wherein multiple write requests are performed to redundantly store the mapping.

7. A non-transitory computer-readable storage medium containing instructions for writing data, the data including one or more storage units, the instructions for controlling a computer system to perform operations comprising:
   receiving a write request, the write request including client data and a client address, wherein the client address identifies the client data;
   segmenting the client data into the one or more storage units;
   computing a storage unit identifier for each of the one or more storage units, wherein the storage unit identifier for each of the one or more storage units uniquely identifies content of a storage unit associated with the storage unit identifier;
   determining, by a metadata server, a mapping between each storage unit identifier to a block server; and
   for each of the one or more storage units, sending the storage unit and the corresponding storage unit identifier to a block server based upon the mapping between the storage unit identifier to the block server, wherein the block server stores the storage unit and maps the storage unit identifier to where the storage unit is stored on the block server, wherein a storage unit that is associated with multiple client addresses is mapped to a single storage unit and stored on a block server one time, wherein the storage unit is not stored multiple times on a single storage medium on the block server, determining a plurality of storage unit identifiers associated with client data;
   for each of the plurality of storage unit identifiers:
      determining if the storage unit identifier is present in a Bloom filter; and adding the storage unit identifier to the Bloom filter based upon the determining the storage unit identifier is not present in the Bloom filter; and calculating an amount of space used by the client data based upon the Bloom filter.

8. The non-transitory computer-readable storage medium of claim 7, wherein the block server determines if the storage unit identifier already exists on the block server, wherein the block server does not store the storage unit on the block server if the storage unit identifier already exists on the block server, and wherein the block server stores the storage unit if the storage unit identifier does not exist on the block server.

9. The non-transitory computer-readable storage medium of claim 8, wherein the operations further comprise:

determining a number of unique storage unit identifiers associated with client data; and calculating an amount of space used by the client data based upon the number of unique storage units identifiers.

10. The non-transitory computer-readable storage medium of claim 7, wherein computing a storage unit identifier for each of the one or more storage units comprises computing a hash of content for a respective storage unit.

11. The non-transitory computer-readable storage medium of claim 7, wherein the operations further comprise:

for each of the one or more storage units, sending the storage unit and the corresponding storage unit identifier to a second block server to redundantly store the storage unit and the corresponding storage unit identifier on multiple block servers.

12. The non-transitory computer-readable storage medium of claim 7, wherein the operations further comprise redundantly storing the mapping between the client address and one or more storage unit identifiers in multiple metadata servers, wherein multiple write requests are performed to redundantly store the mapping.

13. A system comprising:

a metadata server configured to:

receive a write request, the write request including client data and a client address, wherein the client address identifies the client data;

segment the client data into the one or more storage units;

compute a storage unit identifier for each of the one or more storage units, wherein the storage unit identifier for each of the one or more storage units uniquely identifies content of a storage unit associated with the storage unit identifier;

determine a mapping between each storage unit identifier to a block server;

for each of the one or more storage units, send the storage unit and the corresponding storage unit identifier to a block server based upon the mapping between the storage unit identifier to the block server, wherein the block server stores the storage unit and maps the storage unit identifier to where the storage unit is stored on the block server, wherein a storage unit that is associated with multiple client addresses is mapped to a single storage unit and stored on a block server one time, wherein the storage unit is not stored multiple times on a single storage medium on the block server, determining a plurality of storage unit identifiers associated with client data;

determine a plurality of storage unit identifiers associated with client data;

for each of the plurality of storage unit identifiers:

determine if the storage unit identifier is present in a Bloom filter; and add the storage unit identifier to the Bloom filter based upon the determining the storage unit identifier is not present in the Bloom filter; and calculate an amount of space used by the client data based upon the Bloom filter; and store the mapping between each storage unit identifier to the block server.

14. The system of claim 13, wherein the block server determines if the storage unit identifier already exists on the block server, wherein the block server does not store the storage unit on the block server if the storage unit identifier already exists on the block server, wherein the block server stores the storage unit if the storage unit identifier does not exist on the block server.

15. The system of claim 14, wherein the metadata server is further configured to:

determine a number of unique storage unit identifiers associated with client data; and calculate an amount of space used by the client data based upon the number of unique storage units identifiers.

* * * * *